F. V. DETWILER.
ELECTRIC COOKING APPARATUS.
APPLICATION FILED FEB. 20, 1913.
1,191,286.
Patented July 18, 1916.
4 SHEETS—SHEET 1.
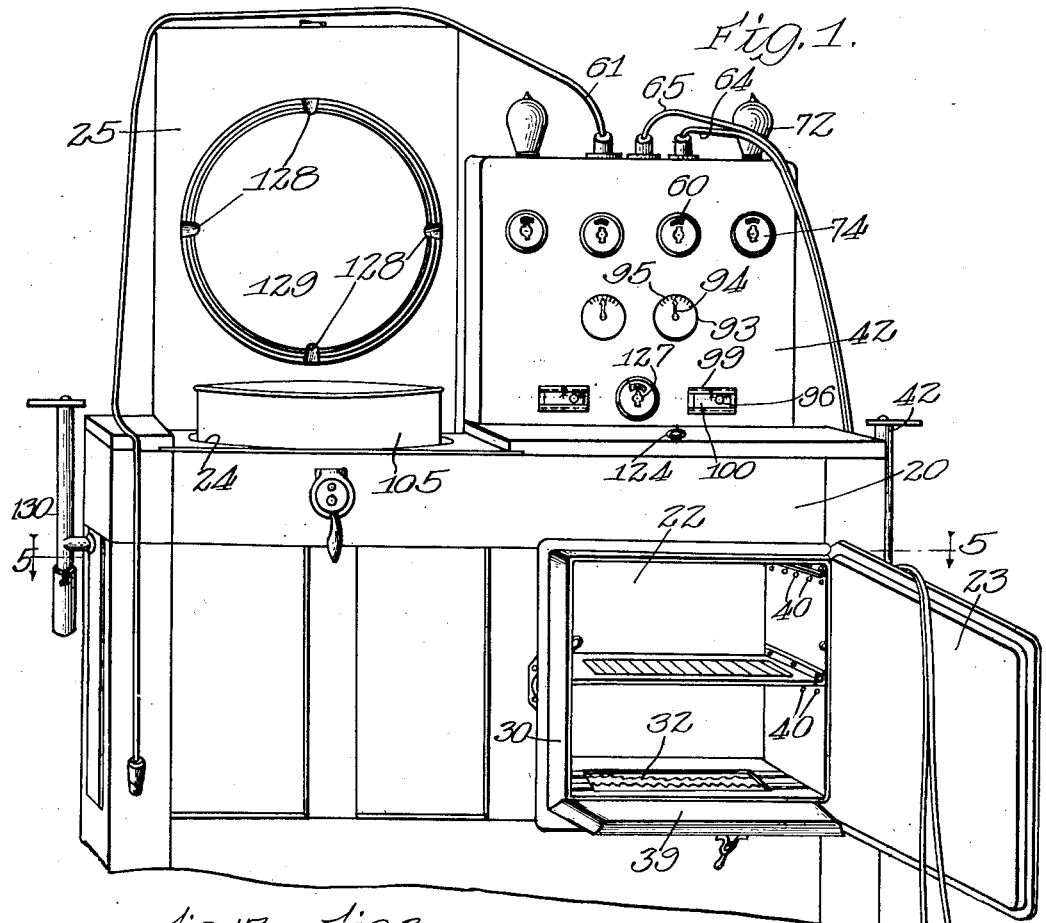
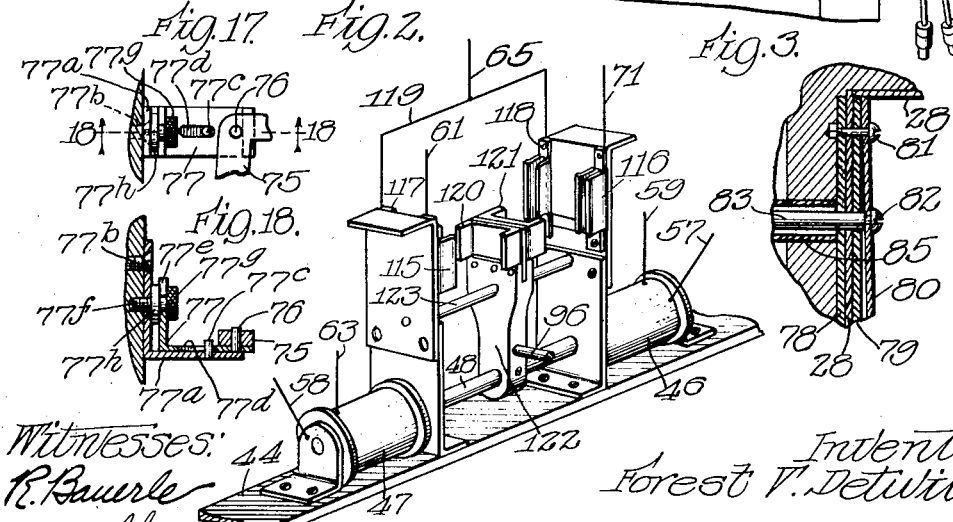

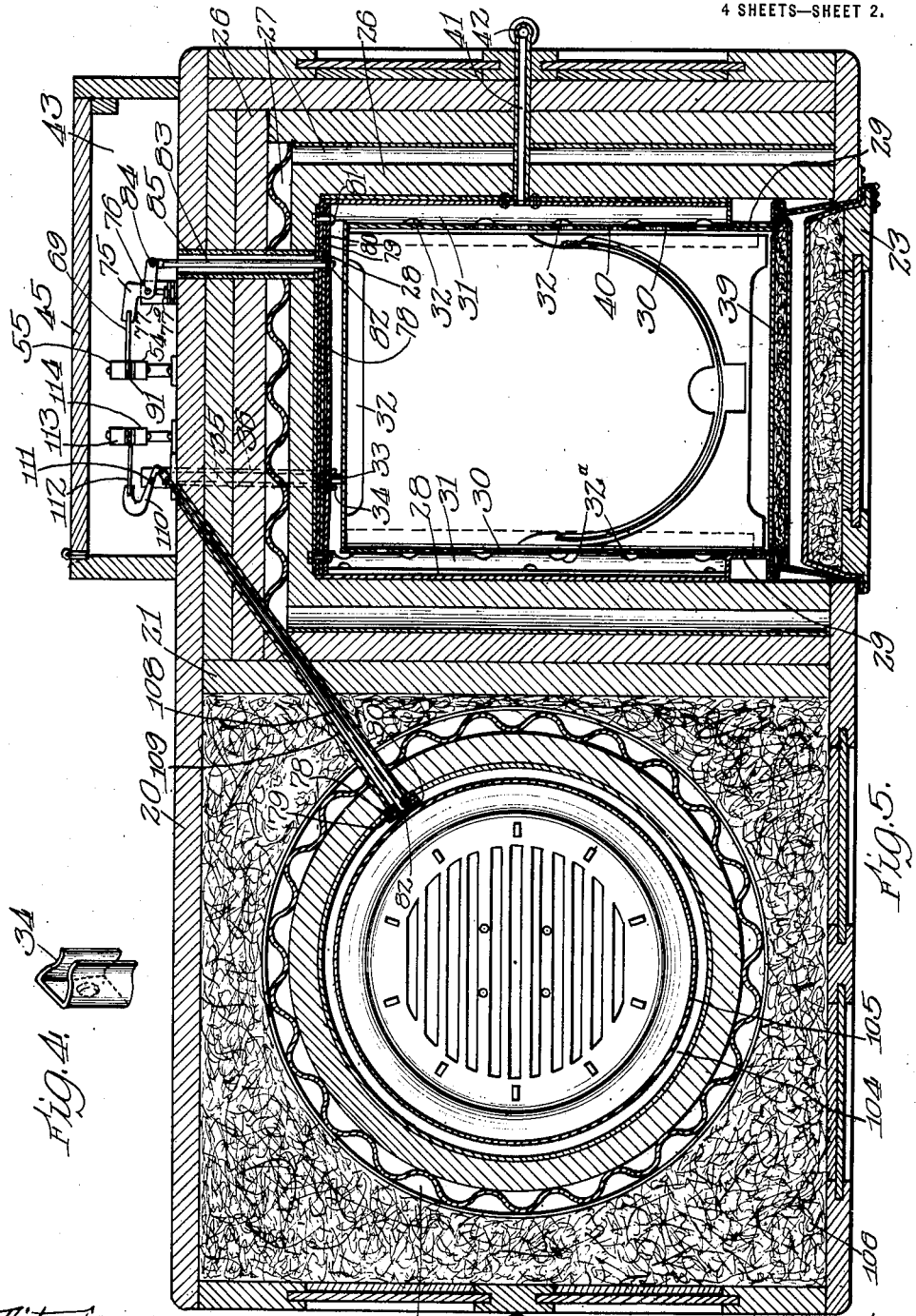

F. V. DETWILER.
ELECTRIC COOKING APPARATUS.
APPLICATION FILED FEB. 20, 1913.
1,191,286.
Patented July 18, 1916.
4 SHEETS—SHEET 3.
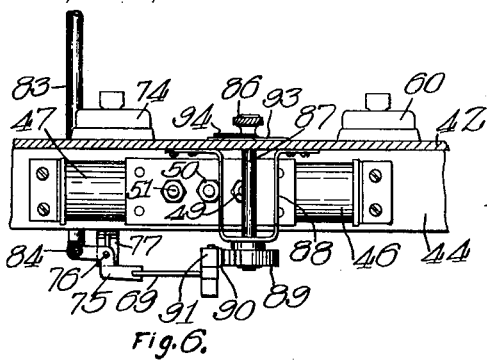
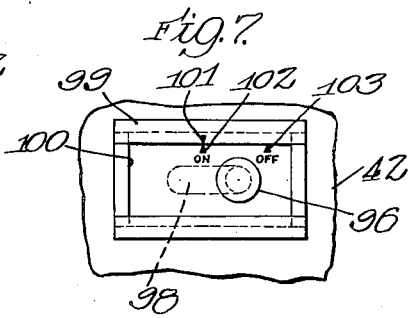
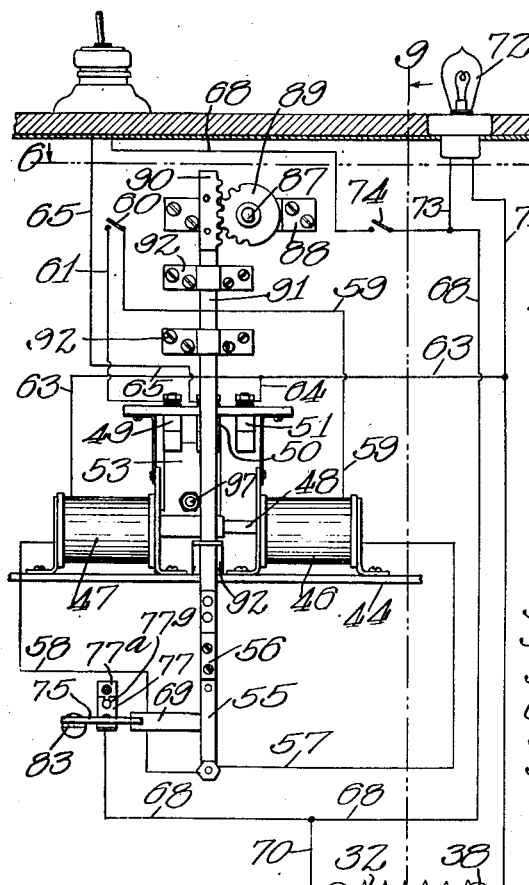
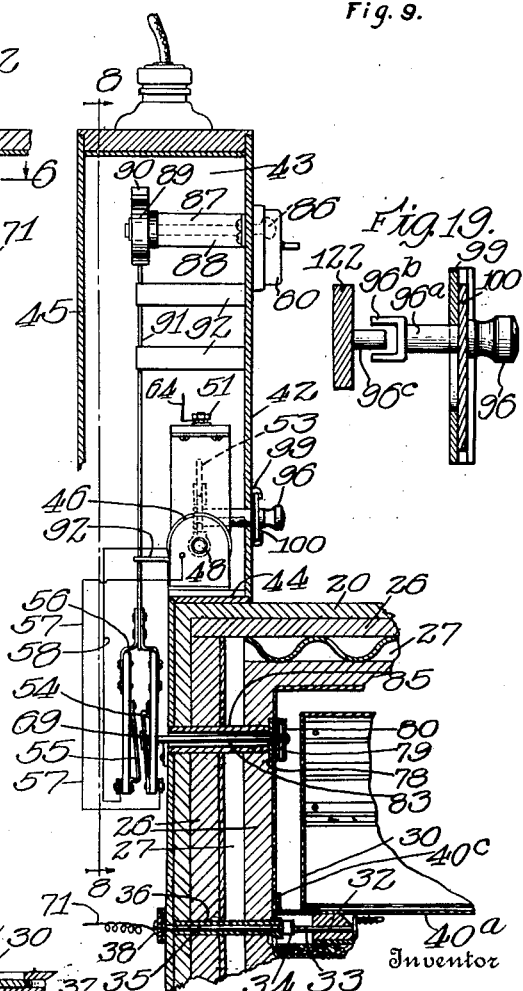
Witnesses
Dwight S. Cole
N. F. Cooper
Inventor
Forest V. Detwiler
By J. H. Jochum Jr.
Attorney F. V. DETWILER.
ELECTRIC COOKING APPARATUS.
APPLICATION FILED FEB. 20, 1913.
1,191,286.
Patented July 18, 1916.
4 SHEETS—SHEET 4.
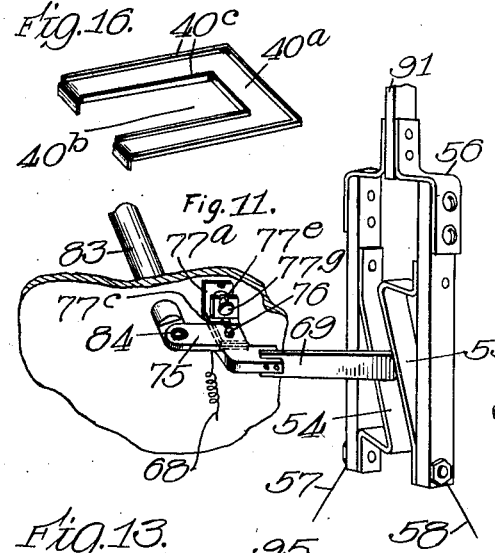
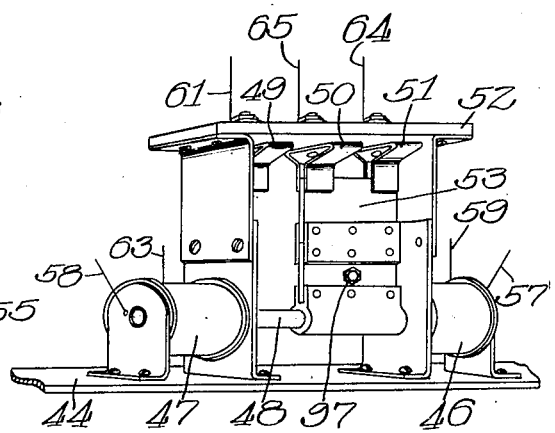
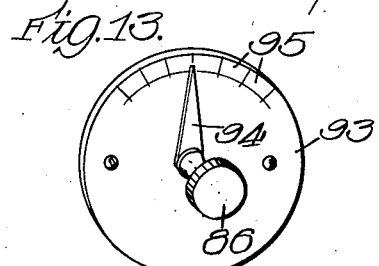
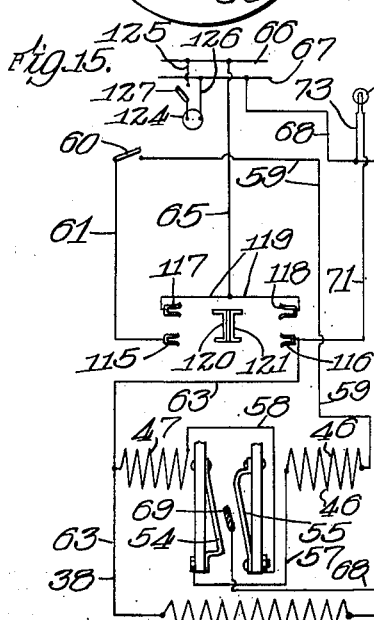
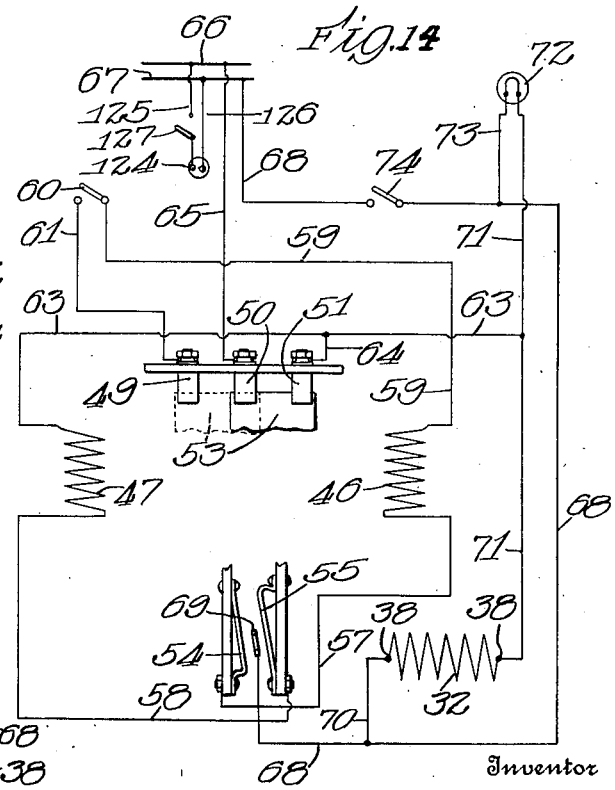
Inventor
Forest V. Detwiler
By J. F. Jochum, Jr.
Attorney
Witnesses
Dwight S. Cole
H. F. Cooper

UNITED STATES PATENT OFFICE.

FOREST V. DETWILER, OF CHICAGO, ILLINOIS.

ELECTRIC COOKING APPARATUS.

1,191,286.  Specification of Letters Patent.  Patented July 18, 1916.

Application filed February 20, 1913. Serial No. 749,654.

*To all whom it may concern:*

Be it known that I, FOREST V. DETWILER, a citizen of the United States, residing at Chicago, in the county of Cook and State of Illinois, have invented certain new and useful Improvements in Electric Cooking Apparatus, of which the following is a specification.

This invention relates to improvements in electric cooking apparatus, and one of the objects of the same is to provide an improved apparatus of this class having means for automatically regulating the temperature thereof.

A further object is to provide an improved automatic temperature controller which is adjustable, so that any predetermined temperature within the range or capacity of the apparatus may be established.

A further object is to provide an improved apparatus of this class which will be simple, durable, and cheap in construction, effective and efficient in operation, and one in which ready access may be had to the parts so that the latter may be readily removed and replaced when desired.

To the attainment of these ends, and the accomplishment of other new and useful objects as will appear, the invention consists in the features of novelty, in substantially the construction, combination and arrangement of the several parts hereinafter more fully described and claimed and shown in the accompanying drawings exemplifying the invention and in which:

Figure 1 is a perspective view with a portion broken away of an improved apparatus of this class constructed in accordance with the principles of this invention. Fig. 2 is a detail perspective view of the make and break device for cutting the circuit in and out. Fig. 3 is a detail sectional view of the thermostatic device. Fig. 4 is a perspective view of a detail. Fig. 5 is a horizontal sectional view as taken on line 5—5, Fig. 1 showing the door of the apparatus closed and with parts broken away. Fig. 6 is a detail sectional view on line 6—6, Fig. 8. Fig. 7 is an elevation of a detail. Fig. 8 is a view as taken on line 8—8, Fig. 9. Fig. 9 is a sectional view taken on line 9—9, Fig. 8. Fig. 10 is a detail view in section showing the manner of connecting the heating element with the circuit. Fig. 11 is a perspective view showing the adjustable contact member and the thermostatically controlled contact coöperating therewith. Fig. 12 is a detail perspective view similar to Fig. 2 of another form of make and break device. Fig. 13 is a detail perspective view of the indicating dial for the adjustable contacts. Fig. 14 is a diagram of the circuit employed with the make and break device shown in Fig. 12. Fig. 15 is a circuit diagram employed with the make and break device shown in Fig. 2. Fig. 16 is a detail perspective view of the condensation tray or pan. Fig. 17 is a detail plan of the bracket or support for the contact carrying arm or lever which latter is actuated by the thermostat. Fig. 18 is a sectional view on line 18—18, Fig. 17. Fig. 19 is a detail view of a modification of the connection between the handle and the shiftable contact.

Referring more particularly to the drawings and in the present exemplification of this invention the numeral 20 designates generally an inclosing casing which may be of any desired size and configuration and constructed of any suitable material, but in the present form of the invention the casing is rectangular in cross-section and is supported at any desired elevation above the floor in any suitable manner such as by means of legs, not shown. The casing is divided by means of a partition 21 into two compartments one of which compartments is provided with an opening 22 through the front of the casing closed by a suitable swinging closure 23, while the other compartment is provided with an opening 24 through the top of the casing, and this latter opening is adapted to be closed by an upwardly swinging closure 25.

Arranged within the compartment which is provided with the opening through the front of the casing is suitable insulating material 26 having dead air spaces 27 and the insulating material is so arranged that it will form a chamber having communication with the opening 22. This chamber is provided with a lining 28 constructed of any suitable material but preferably metal having the walls adjacent the opening 22 preferably formed with offset portions 29 projecting inwardly to abut the outer faces of a removable compartment 30 so as to hold the walls of the compartment 30 spaced from the walls of the lining, and if desired spacing members 31 may be provided between the walls of the two compartments and intermediate the rear wall of the fixed compartment and an adjacent face of the offset portions 29. These spacing members 31 are preferably provided with cut-away or recessed portions 32ᵃ to form openings to permit the heated air to circulate around the oven.

Arranged adjacent an opening in the bottom of the removable compartment 30 is a heating element designated generally by the reference numeral 32 and which element is of the electric type provided with rearwardly projecting contacts 33, see particularly Figs. 5, 9 and 10.

The rearwardly projecting contacts 33 of the heating element are adapted to coöperate with spaced contact members 34, which latter are preferably of a substantially U-shaped formation and are secured to the supporting wall of the casing 20, preferably the rear wall, by means of a bar 35 which latter passes through a suitable insulating tube 36 passing through the rear wall of the casing 20 and the insulating material 26. One of these bars 35 and tubes 36 is provided for each of the contacts 34 and the latter are preferably detachably secured to the bar by means of a suitable fastening screw 37. The other extremity of each of the bars 35 is exposed on the outside of the rear wall of the casing 20 and is constructed to form a binding post 38 for a purpose to be hereinafter described. The cooking compartment thus formed is itself provided with a closure 39 suitably supported so that it will not be in the way, and so that the compartment may be readily removed from the casing. The wall of the removable compartment is provided with suitable apertures or openings 40 through which moisture may pass so as to enter the tubes 41 which leads through the wall of the casing and has communication with a condenser tube 42 on the outside of the casing.

In order to catch and confine any water of condensation that may form on the sides of the removable compartment, there is provided a tray or pan 40ᵃ (see Figs. 10 and 16) which is provided with an opening 40ᵇ therein and a flange 40ᶜ projecting upwardly therefrom, around the edge thereof. This tray or pan is of any desired thickness and is removably arranged in the compartment within the inclosing casing and supported in such a position that the food compartment 30 will rest thereon, and the tray will not interfere with the removal or insertion of the food compartment and may itself be readily inserted or removed, whether the food compartment is in position or not.

A housing designated generally by the reference numeral 43 is arranged preferably at the rear of the compartments just described, and this housing comprises a front wall 42 which extends above the top of the casing 20 and is spaced from the rear of the casing to form a supporting portion 44 for a purpose to be described. The rear of this housing is open so that ready access may be had thereto, and the opening thus formed is closed by a closure 45. Arranged within this housing is the operating mechanism which effects or maintains the temperature within the compartment and will now be described.

Mounted upon the supporting portion 44 are opposed solenoids, the magnets 46—47 of which are spaced from each other and are arranged so that the core 48 passes into each of the magnets. These magnets are spaced for any desired distance and are supported in any suitable manner. Contact members 49—50—51 are mounted upon a suitable support 52, preferably above the magnets, and are arranged in alinement but are spaced from each other a sufficient distance that the contact 53 which is carried by the core 48, when moved into and out of engagement with the contacts 49—51, will always be in engagement with the contact 50 and one or the other of the contacts 49—51, according to which of the magnets 46—47 is energized, in a manner to be hereinafter set forth.

Spaced coöperating contacts 54—55 are secured to a support, designated generally by the reference numeral 56 so that they will always maintain a fixed relation to each other, see particularly Fig. 11. These contacts are each provided with a high and a low portion, the high portion of one being adjacent and opposed to the low portion of the other, and to these contacts are respectively connected the electrical conductor wires 57—58. One of these conductors, the conductor 57 leading from the contact 54, is connected with one end of the winding of the magnet 46. Leading from the other end of this magnet is a conductor 59, see Fig. 14, and which conductor 59 leads to one of the contacts of a switch 60, while a conductor 61 leads from the other contact of the switch 60 to the contact 49. The other conductor 58 which is connected with the contact 55 leads to one end of the winding of the magnet 47, and leading from the other end of the winding of this magnet is a conductor 63 which is connected to the contact 51 by a conductor 64. Leading from the contact 50 is a conductor 65 which is connected with the main line 66. The main line 67 is connected by means of a conductor 68 to one end of a contact member 69, see also Fig. 11, and which contact member is positioned so that it will move between the contacts 54—55, the latter being spaced sufficiently so that when the contact member 69 is in engagement with one it will be out of engagement with the other. Leading from the conductor 68 is another conductor 70 which is connected with one of the contacts 38 of the electrical resistance or heating element 32. A conductor 70 leads from the conductor 68 and is connected with one of the binding posts 38 of the resistance 32 and a conductor 71 leads from the other binding post of the electrical resistance 32 and to a signal light 72, while another conductor 73 leads from the signal light to the conductor 68, so that when the current passes through the resistance 32 the signal light 72 will be lighted, and when the current is cut out of the resistance the signal light will be extinguished. The conductor 63 which is connected with the magnet 47 and also with the contact 51, is also connected with the conductor 71, and a switch 74 is provided in the conductor 68 so as to cut out the resistance 32 at the will of the operator.

The contact member 69 is connected with a bell crank lever 75, see particularly Figs. 5, 11, 17 and 18, and this lever is pivotally supported as at 76 by a bracket supported by a suitable support and which is composed of two members 77—77$^a$, both preferably of an L-shaped formation. The member 77$^a$ is secured to a suitable support as at 77$^b$ and carries the pivot pin 76 on which the lever 75 is pivoted and is also provided with another pin or lug 77$^c$ which projects into a slot 77$^d$ in the member 77. The member 77 is provided with an aperture 77$^e$ which receives the shank of an adjusting screw 77$^f$ that is threaded into the support to which the bracket is secured. The screw is provided with a head 77$^g$ and a shoulder 77$^h$ spaced therefrom and between which head and shoulder a portion of the member 77 of the bracket stands, so that when the screw 77$^b$ is adjusted the member 77 of the bracket which carries the bracket 75 will be correspondingly adjusted with respect to the member 77$^a$ of the bracket, thereby rendering it possible to adjust the thermostatic bar to be hereinafter described, to properly adjust the thermostat, which latter will also be hereinafter described. The conductor 68 instead of being connected directly with the lever 75 or contact member 69 is preferably connected with the supporting bracket.

Arranged within the casing 20 and preferably in the rear of the rear wall of the removable compartment 32, is a thermostat which is preferably constructed of strips 78—79—80, of any suitable material such as metal. The strips 78—79 are preferably of steel and are arranged adjacent each other on opposite sides of the lining 28 of the compartment in the casing and the strip 80, is preferably of brass and is arranged adjacent the strips 79. The strips 79—80 are arranged within the compartment in the casing and adjacent the wall of the compartment 30, so that the heated air will come into contact therewith. The strip 80 is slightly longer than the adjacent strip 79 so that when the ends of the strips are secured together by the fastening devices 81, which devices also pass through the wall 28, the strip 80 will be bowed slightly, as shown in Fig. 3, so that it will be readily influenced by the rise and fall of the temperature. A fastening device 82 is provided for securing one end of the thermostatic rod 83, to the strip 80, and this end of the rod passes through the other strip and also the wall 28, so that when the strip 82 expands or contracts the rod 83 will be moved longitudinally. The rod 83 is secured to the strip 80 to one side of the longitudinal center of the latter and adjacent one end of the strip at the point where the movement of the strip is slight so that the rod will not move to a very great extent. The other extremity of this bar is pivotally connected as at 84 with the other end of the bell crank lever 75, see also Figs. 5 and 11, and is insulated from the lever in any desired or suitable manner to prevent short circuiting. Extending through the wall of the casing 20 adjacent the thermostat is a suitable tubular member 85 through which the rod 83 passes. It will thus be manifest that when the strip 80 of the thermostat is expanded, the rod 83 will be moved longitudinally through the tubular member 85, and will rock the bell crank lever 75 about its point of pivotal support to bring the contact member 69 into engagement with the contact 54 and when the strip 80 contracts under the influence of a lower temperature, the bell crank lever 75 will be rocked about its pivot in the opposite direction to move the contact member 69 into engagement with the contact 55.

In order to establish a predetermined range of temperature the support 56 carrying the contacts 54—55 may be adjusted, by raising it with respect to the contact member 69. This may be accomplished in any desired or suitable manner but preferably by means of an operating handle 86, see particularly Figs. 6, 7 and 9, which is arranged to project beyond the front 42 of the housing 43. The handle is connected with a shaft 87 journaled in a suitable bearing 88, and with the shaft is connected a toothed rotatable member 89. The teeth of this member 89 mesh with the teeth of a rack member 90, and the member 90 is connected with a bar 91 that passes through guides 92 secured to the support 56, so that when the shaft 87 is rotated by the handle 86 the toothed member 89 will be rotated, thereby causing the bar or rod 91 to be raised or lowered according to the direction of rotation of the shaft, to position the contacts 54—55 with respect to the contact member 69. In order to indicate the extent of adjustment of the support 66 a dial 93 may be provided which is arranged adjacent the front 42 of the housing 43 and adjacent the handle 86; a pointer or indicator 94 being connected with the handle and coöperating with the graduations 95 on the dial. The switches 74—60 are also located on the front 42 of the housing 43 and in a convenient position for the operator.

The contact 53, see Figs. 6 and 12, is adapted to be shifted manually so as to establish a circuit through the heating element 33 or to cut out the element to start or stop the operation of the apparatus. In order to accomplish this there is provided a handle or operating member 96, see also Fig. 9, which is connected by one extremity to the contact member 53 preferably by passing into an opening 97 in the support for the contact, and the handle 96 is located adjacent the front 42 of the housing 43 in a convenient position for the operator. This handle passes through a suitable slot 98 in the front of the housing 43, see particularly Figs. 7 and 8, and a plate 99 which is also provided with a slot is secured to the front of the housing so that the slot therein will register with the slot 98. A slide 100 is connected with the handle 96 to move therewith and is arranged to move in the guides formed by overhanging portions of the plate 99. The plate 100 is imperforate with the exception of the opening through which the handle passes and is adapted to move with the handle so that the slot 98 in the casing will always be closed. Thus it will be seen, that by shifting the handle 96 in one direction or the other, the contact member 53 will be accordingly shifted so that it will either engage the contacts 50—51 or the contacts 50—49.

In order to indicate the position to which the contact 53 should be adjusted, there is provided an indicator 101, preferably arranged on the plate 99, and with which the indications 102 and 103 on the slide 100 coöperate, and these indications 102 and 103 are provided with suitable designating characters such for instance as "On" and "Off," the former being adapted to register with the indication 101 when the contact 53 is in engagement with the contacts 50—51 that cuts in the heating element or resistance 32. The latter indication 103, registers with the indicator 101, when the contact 53 engages the contacts 50—49, that cuts off, or out the resistance element 32. Thus it will be manifest that all of the operating parts with the exception of the switches, dials, and the adjusting handle 96, are housed within the housing 43, to which housing access may be readily had by opening the closure 45, which is provided for the open side of the housing.

Referring now more particularly to Fig. 14, and assuming the contact 53 to be in engagement with the contacts 50—51 and with the switches 60—74 closed, and contact member 69 in engagement with the contact 54, which will be the position the parts will assume when it is desired to start the apparatus, the contact 53 being moved into the position shown in full lines in Fig. 14 by the adjustment of the handle 96, the circuits will be as follows: from the main line 67 through conductor 68, switch 74, conductor 68, conductor 70, contact 38, resistance 32, contact 38, conductor 71, conductor 63, conductor 64, contact 51, contact member 53, contact 50, conductor 65 to the main line 66. At the same time a circuit will also be established from the conductor 71 to the conductor 73 through signal light 72, and to the conductor 68. Whenever the resistance 32 is thus cut in, the signal light 72 will be lighted, and will serve as an indication to the operator of the machine that the resistance is cut in. The contact member 53 will remain in this position and the temperature within the casing will rise and continue to rise until the strip 80 of the thermostat, see also Fig. 3, is expanded under the influence of the high temperature, a sufficient distance to cause the contact member 69 to be moved out of contact with the contact 54 and into engagement with the contact 55. Immediately the contact 69 engages this contact 55, a circuit will be established through the magnet 47 of the solenoid as follows: from the main line 67 through the conductor 68 through the contact member 69, through contact 55, through conductor 58, through the magnet 47, through conductor 63, through conductor 64, through contact 51, through contact member 53, through contact 50, through contact 65, back to the main line 66. Immediately this magnet 47 is energized, it will attract the core 48 and will shift the contact member 53 from the position shown in full lines in Fig. 14 to the position shown in dotted lines in Fig. 14 thereby cutting out the heating resistance 32 and also extinguishing the signal light 72. Should it be desired to stop the operation of the apparatus at this point, that is to maintain the resistance 32 cut out, the switch 60 can be opened or it may be opened before the apparatus is started. If, however, it is desired to maintain a substantially uniform temperature within the apparatus, and to automatically shift the contact member 53 so as to cut in the resistance 32 when the temperature is too low, the switch 60 is closed and the operation will be as follows, assuming, of course, that the contact member 69 is out of engagement with the contact 54 and the contact member 53 is in engagement with the contacts 50—49. The parts will remain in this position until the temperature has lowered to contract the strip 80 of the thermostat sufficiently to cause the contact member 69 to move into engagement with the contact 54, with the contact member 69 in engagement with the contact 54, the circuit will be as follows: from the main line 67, through conductor 68, switch 74, conductor 68, to contact member 69, from contact member 69 to contact 54, from contact 54, through conductor 57, magnet 46, conductor 59, switch 60, conductor 61, contact 49, contact member 53, conductor 50, conductor 65 and back to the main line 66. Immediately the magnet 46 is energized the core 48 will be attracted thereby and the contact member 53 will be shifted from its dotted line position in Fig. 14, to its full line position, thereby cutting out the magnet 47 and cutting in the resistance 32 and the signal light 72. This automatic shifting of the contact member 53 will be repeated by the rise and fall of the temperature in the casing thereby automatically maintaining the temperature uniform.

Arranged within the other half of the casing 20, as shown more clearly in Figs. 1 and 5 is another cooking compartment 104, which differs from the cooking compartment just described in that the former is designed primarily for baking purposes while the compartment now to be described is designed more particularly for other forms of cooking. This compartment 104 has a removable casing 105 and is insulated from the walls of the inclosing casing 20 by means of the insulation 106 and the air spaces 107. The thermostat in this compartment is similar to the thermostat already described and is arranged between the casing 105 and the wall of the compartment. The rod 108 which is connected with the expansible element of the thermostat in a manner similar to the rod 83, passes through a tubular member 109 similar to the tubular member 85, reference being had particularly to Fig. 5. The free end of the rod 108 is pivotally connected to a lever 110 pivoted intermediate its ends as at 111, and insulated therefrom, and to the other end of the lever 110 is connected a contact member 112 which operates between spaced contacts 113—114, similar to the contacts 54—55. The tubular member 109 and the bar 108 pass through the walls of the casing 20 and the insulating material therein in a manner that the free extremity of the rod will project into the housing 43. The lever 110 is supported by a bracket preferably constructed in a manner similar to the bracket which supports the lever 75.

Arranged within the compartment 104 is a heating element similar to the heating element 32, but not shown. The temperature controlling mechanism, the opposed magnets, the shifting mechanism and the circuits for this portion of the apparatus, other than the parts which have been just specifically described, are the same and therefore the specific description of the parts as well as the circuits which have been already set forth, apply equally as well to this portion of the apparatus, and need not be repeated.

Referring now more particularly to Fig. 2 there is shown a different form of make and break mechanism and is designed more particularly to overcome any arcing which might occur with the use of a make and break mechanism similar to that shown in Fig. 12.

In Fig. 2 instead of the three contacts 49—50—51, four contacts are employed and in this instance the contact 115, see also Fig. 15, corresponds with the contact 49 and the contact 116 corresponds with the contact 51. In lieu of the contact 50 two contacts 117—118 are provided and these two contacts are bridged or connected together by means of a conductor 119 to which the conductor 65 leading from the main line 66 is connected. The conductors 115—117 are spaced from and respectively opposed to the contacts 116—118, and opposed contacts 120—121 are provided which coöperate respectively with the contacts 115—117 and 116—118. These contacts 120—121 are insulated from each other and are connected to a supporting member 122 which in turn is connected with the core 48 of the magnets 46—47. The operating handle 96 is connected with the member 122 so that the latter may be shifted manually to move the contacts 120—121 respectively into engagement with the contacts 115—117 and 116—118. The contact 116 is connected with the magnet 47 by means of the conductor 63, and the conductor 71 leads from the contact 116 to the signal light 72. The contact 115 which corresponds with the contact 49 is connected with the magnet 46 through the medium of the conductor 61 and conductor 59, and the switch 60 is arranged in the conductors 61—59. The contact member 69 is connected with the conductor 68. The circuit with this wiring and as shown in Fig. 15 will be the same as the circuit with the wiring shown in Fig. 14 with the exception that instead of a singular contact, such as contact 50 in Fig. 14, being continually in contact with the contact member 53, the contacts are arranged in separate pairs one contact of each pair being bridged or connected together. Assuming the contact member 121 to be in engagement with the contacts 116—118, and with the contact member out of engagement with the contact 55, and the switches 60—74 closed, the circuit briefly stated will be as follows: from the main line through conductor 68, including switch 74, through the heating element 32, through conductor 63, through contact 116, contact member 121, contact 118, conductor 119, conductor 65, back to the main line. At the same time a circuit will be established from conductor 68 through conductor 73, signal light 72, conductor 71, contact 116, conductor 121, contact 118, conductor 119, conductor 65, back to the main line. The element 32 will thus be energized and remain in this condition until the contact member 69 engages the contact 55, at which time a circuit will be established from the main line through conductor 68, contact member 69, contact 55, conductor 58, magnet 47, conductor 63, contact 116, contact 121, contact 118, conductor 119, conductor 65, back to main line. The magnet 47 thus energized will attract the core 48, and automatically shift the element 122, to move the conductor 121 out of engagement with contacts 116—118, thereby cutting out the element 32 and moving the contact 120 into engagement with the contacts 115—117. The parts will remain in this position until the temperature lowers sufficiently to cause the contact member 69 to engage the contact 54, at which time a circuit will then be established as follows: from main line, through conductor 68, contact member 69, contact 54, conductor 57, magnet 46, conductor 59, switch 60, conductor 61, contact 115, contact 120, contact 117, conductor 119, conductor 65 back to main line. The magnet 46 thus energized will shift the element 122, to move the contact 120 out of engagement with the contact 115—117, and move the contact 121 into engagement with the contacts 116—118, thereby cutting in the resistance 32 to raise the temperature.

If desired a guide 123 may be provided for the element 122 and comprises a bar or rod which is mounted on any suitable fixed support and passes loosely through an opening in the element 122, preferably arranged above the core 48.

It will thus be manifest that the temperature may be automatically maintained and the limits or range of the temperature may be varied at the will of the operator, at the same time the switch 60 may be opened so that when the temperature has reached its highest point, the heating element 32 will be automatically cut out and remain so, or the switch 60 may be closed and the temperature will then be automatically maintained uniform for any desired length of time. It will also be manifest that the cooking compartments as well as the heating elements may be readily removed when desired and access may be readily had to the operating parts, while at the same time all of these parts will be protected and inclosed.

A separate socket 124 may be provided in the top of the casing 20, so that an element may be placed in position on the casing and employed for cooking or heating purposes, and to this socket conductors 125—126 lead from the main lines 66—67 (see Figs. 14 and 15) a controlling switch 127 operable from the front of the casing is arranged in the circuit of this socket 124.

Vapor outlets 128 may be provided in the plug or extension 129 on the closure 25 of the compartment 105, so that when the closure is closed, the vapor may readily escape to enter the condenser 130.

While in the present exemplification of this invention the preferred forms and constructions have been herein shown and described it is to be understood that various changes may be made in the details of construction and in the combination and arrangement of the several parts within the scope of the claims without departing from the spirit of this invention.

In the present form of the invention the thermostatic rod 83 is shown as being preferably secured to the thermostatic element 80 adjacent one end of the latter, but it is to be understood that it can be secured adjacent the center of the element so that its rod will act quicker and have more movement.

In Fig. 19 the handle 96ᵃ is shown as being disconnected from the element 122, and is provided with a forked end 96ᵇ which end receives the stud 96ᶜ on the element 122, so that the handle and stud are separate from each other, thereby overcoming any tendency for the parts to bind during their movement.

What is claimed as new is:—

1. An apparatus of the character described, embodying a casing, electric heating means within the casing, and means for automatically making and breaking the heating circuit at predetermined temperatures, the second recited means embodying spaced opposed magnets, a core extending from one of the magnets to the other and a contact member connected with the core and bodily shiftable therewith, and means connected with the core for manually shifting the latter.

2. An apparatus of the character described, embodying a casing, electric heating means within the casing, and means for automatically making and breaking the heating circuit at predetermined temperatures, the second recited means embodying spaced opposed magnets, a core extending from one of the magnets to the other and a contact member connected with the core and bodily shiftable therewith, a handle connected with the core and extending to the outside of the casing through an opening in the wall of the casing and a shield connected to and movable with the handle for closing such opening.

3. An apparatus of the character described, embodying a casing, electric heating means within the casing, means for automatically making and breaking the heating circuit at predetermined temperatures embodying opposed electric responsive devices including a core passing from one of the devices to the other and a contact connected with the core and bodily shiftable therewith, thermostatic means for controlling the action of said devices, one of said devices being included in the heating circuit, a circuit for the other of the said devices, means for cutting out the last recited device to render it ineffective to the action of the said thermostatic means, additional means for directly shifting the contact, and a signal light included in the heating circuit.

4. An apparatus of the character described, embodying a casing, electric heating means within the casing, means for automatically making and breaking the heating circuit at predetermined temperatures embodying opposed electroresponsive devices including a core passing from one of the devices to the other and a contact connected with the core and bodily shiftable therewith, thermostatic means for controlling the action of said devices, one of said devices being included in the heating circuit, a circuit for the other of the said devices, means for cutting out the last recited device to render it ineffective to the action of the said thermostatic means, manual means for directly shifting the said contact for establishing or disestablishing the heating circuit, and means indicating the position of said contact.

5. An apparatus of the character described, embodying a casing, electric heating means within the casing, means for automatically making and breaking the heating circuit at predetermined temperatures embodying opposed electric responsive devices including a core passing from one of the devices to the other and a contact connected with the core and bodily shiftable therewith, thermostatic means for controlling the action of said devices, one of said devices being included in the heating circuit, a circuit for the other of the said devices, means for cutting out the last recited device to render it ineffective to the action of the said thermostatic means, a handle connected with the contact for manually shifting the latter, said handle passing through an opening in the casing wall, and a cover plate for the slot connected and movable with the handle.

6. An apparatus of the character described, embodying a casing, electric heating means within the casing, means for automatically making and breaking the heating circuit at predetermined temperatures embodying opposed electric responsive devices including a core passing from one of the devices to the other and a contact connected with the core and bodily shiftable therewith, thermostatic means for controlling the action of said devices, one of said devices being included in the heating circuit, a circuit for the other of the said devices, means for cutting out the last recited device to render it ineffective to the action of the said thermostatic means, a handle connected with the contact for manually shifting the latter, said handle passing through an opening in the casing wall, a cover plate for the slot connected and movable with the handle, and an indicator for indicating the position of the said contact.

7. An apparatus of the character described, embodying a casing, electric heating means within the casing, means for automatically making and breaking the heating circuit at predetermined temperatures embodying opposed electric responsive devices including a core passing from one of the devices to the other and a contact connected with the core and bodily shiftable therewith, thermostatic means for controlling the action of said devices, one of said devices being included in the heating circuit, a circuit for the other of the said devices, means for cutting out the last recited device to render in ineffective to the action of the said thermostatic means, a handle connected with the contact for manually shifting the latter, said handle passing through an opening in the casing wall, a cover plate for the slot connected and movable with the handle, and an indicator for indicating the position of the said contact.

In testimony whereof I have signed my name to this specification, in the presence of two subscribing witnesses, on this 17th day of February, A. D. 1913.

FOREST V. DETWILER.

Witnesses:
FLORENCE E. SCHULTZ,
FREDERICK W. JOB.